United States Patent [19]

Tomosue

[11] 4,366,896
[45] Jan. 4, 1983

[54] DEVICE FOR ARRANGING HEN'S EGGS IN ERECT POSTURES

[76] Inventor: Hiroshi Tomosue, 1855 Shimoyokono, Tsuyama City, Okayama-ken, Japan

[21] Appl. No.: 215,383

[22] Filed: Dec. 11, 1980

[30] Foreign Application Priority Data

Mar. 29, 1980 [JP] Japan ................... 55-41018

[51] Int. Cl.³ .............. B65G 17/32; B65G 13/02; B65G 15/00
[52] U.S. Cl. .................... 198/384; 198/394; 198/688; 198/836
[58] Field of Search .............. 198/728, 836, 416, 394, 198/384, 688, 698, 699; 53/434

[56] References Cited

U.S. PATENT DOCUMENTS

| 2,844,926 | 7/1958 | Mattos | 53/534 |
| 3,093,234 | 6/1963 | Janssen | 198/408 |
| 3,311,216 | 3/1967 | Jones | 53/534 |
| 3,497,052 | 2/1970 | Willsey | 198/834 |
| 4,009,553 | 3/1977 | Monjo | 53/534 |
| 4,036,355 | 7/1977 | Valli | 198/688 |
| 4,149,355 | 4/1979 | Clegg | 53/534 |
| 4,189,898 | 2/1980 | Moulds | 53/534 |
| 4,257,516 | 3/1981 | Iowescu | 198/416 |

Primary Examiner—Robert B. Reeves
Assistant Examiner—Brian Bond
Attorney, Agent, or Firm—Wenderoth, Lind & Ponack

[57] ABSTRACT

A device for arranging hen's eggs in erect postures keeping their acute-curved ends below, which comprises; a plurality of passages which slope downward and through which the eggs are moved downwardly slantwise while being kept in longitudinal postures respectively; an endless driven member having a number of crossbars disposed in series at regular intervals, the crossbars keeping the eggs one by one and moving them downwardly within the passages respectively; a plurality of holders to prevent rotation of each egg; and a plurality of U-like shape groved members so that the eggs are turned to be directed vertically.

5 Claims, 12 Drawing Figures

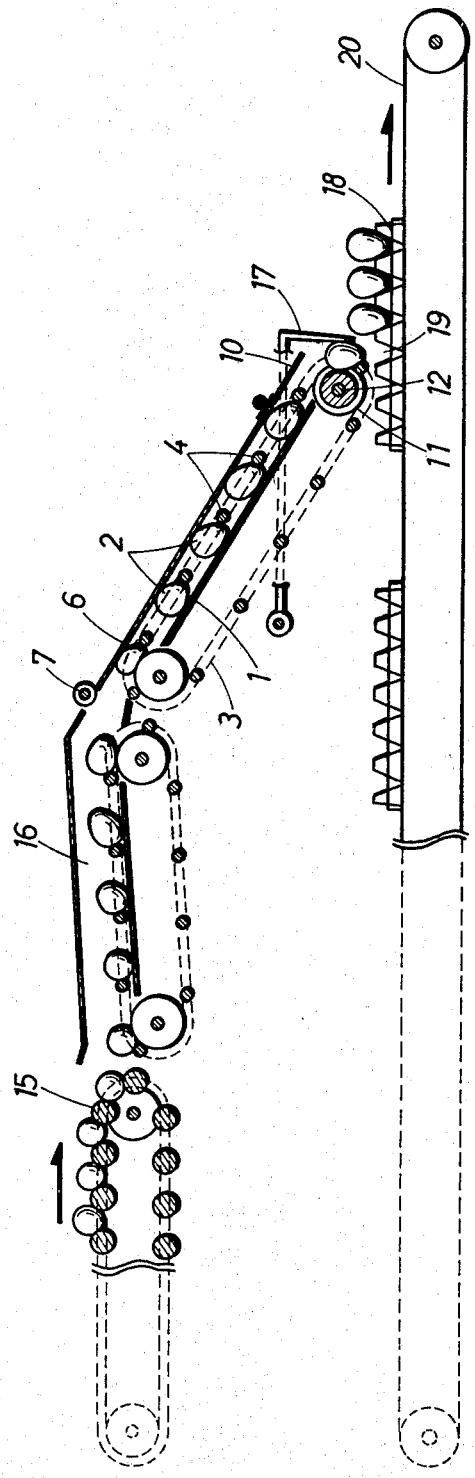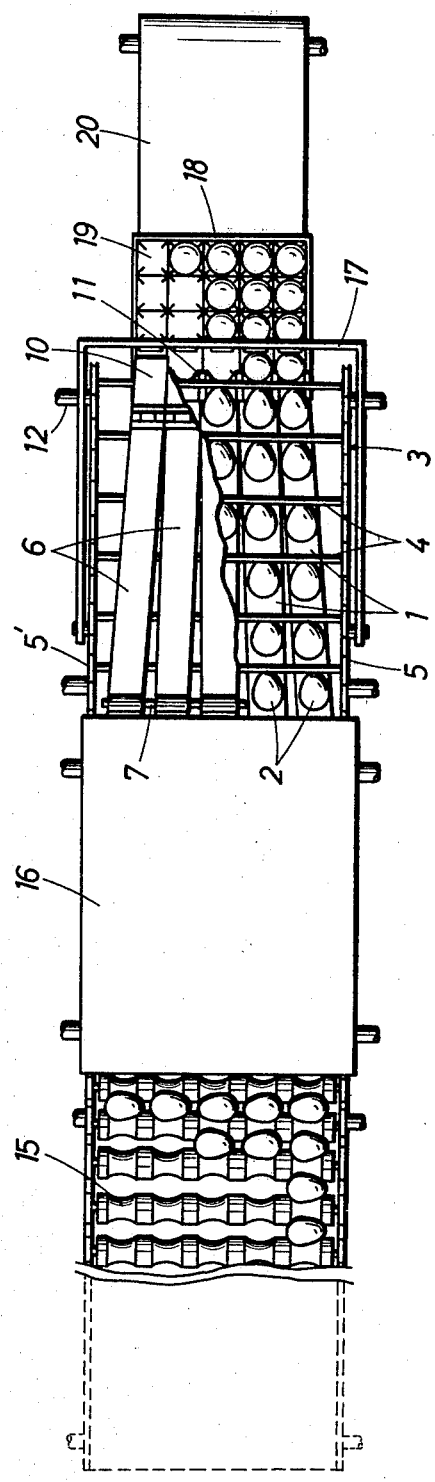

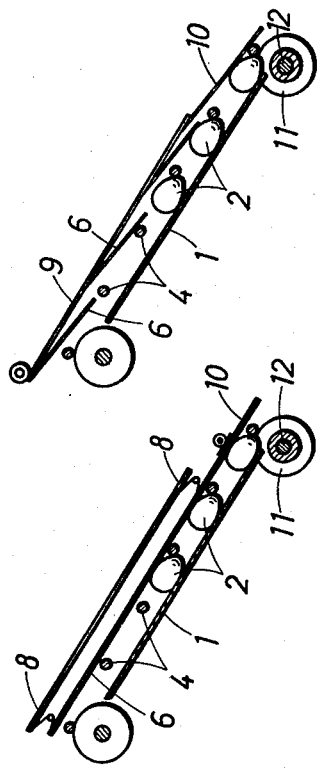
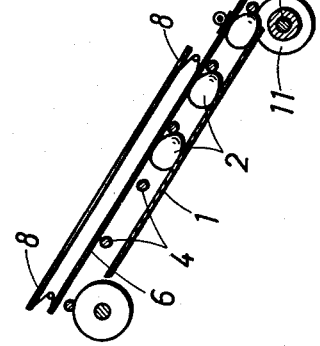
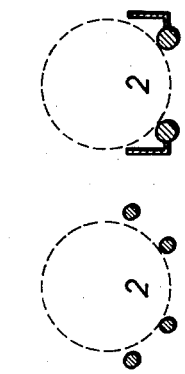
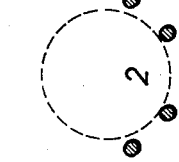
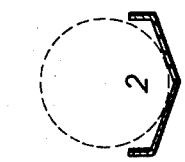
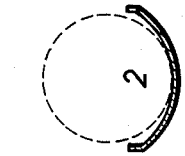
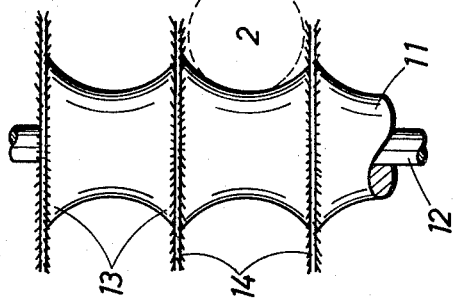
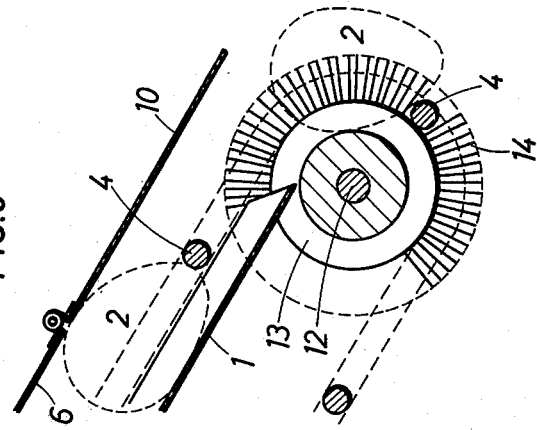
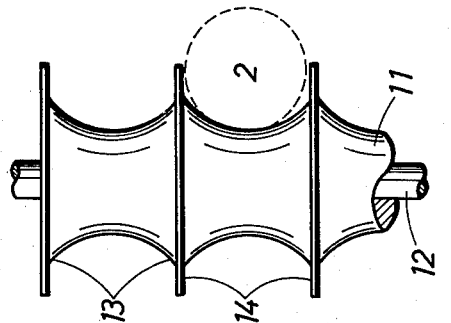
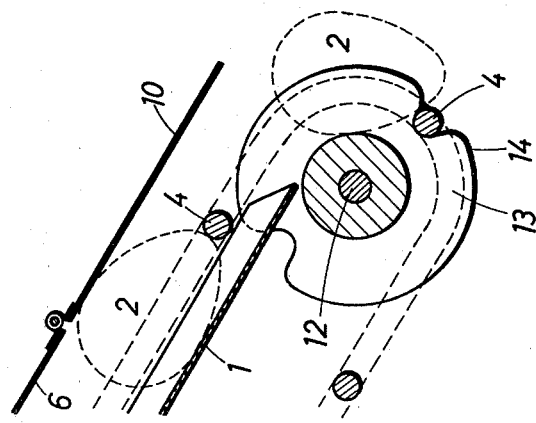

DEVICE FOR ARRANGING HEN'S EGGS IN ERECT POSTURES

BACKGROUND OF THE INVENTION

This invention relates to a device for arranging hen's eggs in erect postures keeping their acute-curved ends below and obtuse-curved ends upper so that when a large number of eggs are packed in cartons for selling or transferring them, they are arranged in uniform appearance and also prevented from being broken by impact or external pressure.

Conventionally, devices for arranging the eggs in erect postures have been developed at need of treating with a large number of eggs, some of which devices have already been put in practical use. The conventional devices, however, all are defective in that the construction is complicated to often have trouble, or the eggs are breakable, so that any satisfactory device, as well known, have not been proposed.

OBJECT OF THE INVENTION

An object of the invention is to provide a device for arranging hen's eggs in erect postures keeping their acute-curved ends below, which device is simple and strong in construction and inexpensive to produce, and has no fear of breaking the eggs.

Another object of the invention is to provide a device for arranging the eggs in erect postures keeping their acute-curved ends below, the device being able to be readily incorporated with an automatic mass egg-treatment apparatus, such as an egg constinuous feeder, a posture control device, and a carton conveyer.

BRIEF DESCRIPTION OF THE DRAWINGS

FIG. 1 is a longitudinal sectional side view of a principal portion,

FIG. 2 is a plan view thereof,

FIGS. 3a–3d are cross sectional views showing embodiments of passages for eggs,

FIGS. 4 and 5 are longitudinal sectional views showing embodiments of a holder, and FIGS. 6 through 9 are partially cutaway side views and partially cutaway plan views of an embodiment of U-like shaped grooved members.

DETAILED DESCRIPTION OF THE INVENTION

Referring to the drawings, reference numeral 1 designates a plurality of passages for hen's eggs, which slope acutely downward so that the eggs can readily slide down keeping their lengthwise postures in the forward direction. The passages 1 each are formed in trough-like shape to allow the eggs 2 to slide as the above. It is preferable that the passages 1 each have the bottom, as shown in FIGS. 3-(a) to -(d), formed in a circular arc, or V-like shape, or formed of a hurdle-like member or rail-like member, extending longitudinally. The bottom of each passage 1 is proper to be formed of a material of less friction factor, e.g., nylon, polyethylene or Teflon, is designed enough to have a width of about 50 mm, slightly larger than an average diameter of egg 2, and slope down at an angle of about 25 to 40 degrees.

Reference numeral 3 designates an endless driven member, which comprises a number of crossbars 4 arranged in series so that the eggs 2 are, one by one, supported by the crossbars 4 and slide down slowly therethrough within the respective passages 1. The endless drive member 3 comprises two chains 5 and 5' extending at both lateral sides and a number of crossbars 4 parallel to each other and spaced at regular intervals, and is driven slowly along the upper portions of passages 1. The eggs 2 each are received in the interval between each crossbar 4 and within each passage 1 in relation of being positioned longitudinally. Hence, it is necessary for each interval to be matched with at least usual length, i.e., more than about 75 mm, of each egg 2.

Reference numeral 6 designates egg holders which extend substantially throughout the passages 1 lengthwise thereof and along the upper portion of the respective passages 1 and lightly hold the downwardly moving eggs 2 to thereby prevent them from rotating by itself in the longitudinal postures. The eggs 2, when sliding down along the acute slopes of passages 1 while being kept in longitudinal postures, tend to rotate as they are due to their particular shapes, which tendency becomes remarkable even to an extent that a resistance against sliding increases a little because dust is attached faintly to the slope. The passages 1, in practice, are difficult to always prevent egg white or yolk as well as dust from attaching to the passages 1, whereby it is not avoidable to increase the resistance to a certain extent. As a result, any means is required to prevent the eggs 2 from rotating by themselves in longitudinal postures, so that the holders 6 can fully meet the requirement as the above means. The holders 6 are not always limited to each have a plate-like shape, but alternatively may be formed in a shape approximately the same as one of the turned-over bottoms of passages 1 shown in FIG. 3. The holders 6 also are enough to use material similar to that of each passage 1, not to hinder a slide-down of each egg 2. Furthermore, it is necessary for the holders 6 to be lightly vertically movable correspondingly to not-uniform sizes, i.e., different diameters, of eggs 2 being sliding down within the passages 1. Therefore, the respective holders 6, as shown in FIG. 1, are pivoted at its one end to a suitable pivot shaft 7 so that the holding of eggs 2 depends only upon weight of holder 6 itself; suitable weak elastic members 8, as shown in FIG. 4, suspend the holder 6 to lightly contact with the eggs 2; or each holder 6 itself, as shown in FIG. 5, is formed of a plurality of weak elastic members and mounted on a suitable support 9. In the latter case, the elastic members are proper to use thin plates or bristles, of nylon, polyethylene or Teflon. The holders 6, when constructed to be freely upwardly bent or curved at the end portion 10 thereof, are reduced in pressure applied to the eggs 2 at the curved portion where eggs 2 move from the end of each passage 1 to the U-like shaped grooves 11 and turn vertically. Hence, the eggs 2, especially the longer ones or lightweight ones, are free from staying at the curved portion due to difficulty of thoroughly curved movement. As a result, the eggs 2 at one interval between two adjacent crossbars 4 within each passage 1 can be turned simultaneously vertically. The end portion 10 may be formed of a weak elastic plate or a number of thin wires, or may comprise a separate piece vertically movable as shown in FIG. 1 or others, thereby being made possible to readily bent or curve upwardly.

The U-like shape grooved members 11 are connected to the end of passage 1 and substantially inscribed at at least the front surface in the path of the respective crossbars 4 at a plurality of passages 1, the crossbars 4 turning back at the lower end of endless driven member 3, so that the eggs 2 sliding down along the slope of passage 1 are turned vertically. The U-like shape grooved members 11 may be fixed. Alternatively, it is more effective to provide the U-like shape grooves circumferentially of a rotar to thereby be rotatable together with a drive shaft 12 for endless driven member 3. In this instance, side walls 13 of grooves, when made rotatable projecting partially outwardly from the path of crossbars 4, can stabilize the vertical postures of eggs 2 due to the provision of projections 14 of side walls 13. Furthermore, the projections 14, which are formed of thin plates or bristles, e.g., of nylon, polyethylene or Teflon, can well stabilize the vertical postures of eggs 2 even of remarkably not-uniform sizes.

Next, function of the device of the invention will be described. A large number of eggs 2, which are conveyed sequentially in relation of being arranged to be directed longitudinally forward at their acute-curved ends through a proper continuous egg feeder 15 or posture control device 16, enter the plurality of passages 1 respectively. Since the respective passages 1 are acutely sloped and the crossbars 4 are driven downwardly slowly along the upper sides of passages 1, the eggs 2 positioned lengthwise thereof and directed forward and downward at their acute-curved ends are supported by the crossbars 4 and slide down slowly within the passages 1 respectively. The holders 6, which are provided at the upper sides of passages 1 and throughout lengthwise thereof so as to lightly contact with the eggs 2, prevent the eggs 2 from rotation in longitudinal postures while moving downward. Hence, the eggs 2 reach the end of the respective passages 1 without changing their postures as foregoing. The U-like shape grooved members 11 are connected with the end of each passage 1 and the end portions 10 of holders 6 are able to freely upwardly bend or curve, whereby the eggs 2 passing through the ends of passages 1 are guided smoothly to the U-like shape grooves regardless of different sizes or weights of eggs 2, thereby turning vertically simultaneously in every row. Since the side walls of U-like shape groove members 13 are partially expanded or formed of elastic members, the eggs 2 are turned to take stable vertical postures. The side walls 13 at the grooved members 11 constructed as foregoing, will be effective even in unfavorable conditions such that the interval between each of the plurality of passages 1, as shown in FIG. 2, is made larger at the initial end connected to the egg posture control device 16 and becomes smaller toward the terminus so that lateral inclination is added to each sliding egg 2.

In front of each U-like shape groove member 11 is provided a switching device 17 to alternately hold and release the eggs 2 according to regular timing, so that the eggs 2 drop in the lump onto egg seats 19 of an egg carton 18 arranged below and stand upright thereon. The timing is controllable simply and reliably through association with the driven crossbars 4. Then, the egg carton 18 are placed on a carton conveyer 20 driven synchronously with the switching device 17, so that the egg seats 19 are moved forward at every pitch, thus filling the egg seats sequentially with eggs 2 arranged uniformly. In addition, a rotary shaft for U-like shape grooved members 11, as shown in the drawings, is used in common with the drive shaft 12 at the lower turn-back point of endless driven member 3 and the working radius of each driven crossbar 4 at the turn-back point is designed to be as smaller as possible, whereby a height of falling egg 2 down to the egg seat 19 can be reduced in full. Hence, the impact against the eggs 2 when falling, is restricted to minimum to thereby improve safety with respect to the eggs.

I claim:

1. A device for arranging hen's eggs in erect postures, said device comprising,
    (a) a plurality of passages for said eggs, which are sloped downwardly at an acute angle so that said eggs can readily slide down along said passages keeping their lengthwise postures,
    (b) an endless driven member being provided with a number of crossbars arranged in series and for slowly downwardly moving said eggs one by one within said passages,
    (c) holders extending along the upper side of each of said passages and substantially throughout lengths thereof so as to lightly hold said eggs which are moving downward, thereby preventing said eggs from rotating in their longitudinal postures, and
    (d) U-like shape grooved members which are connected with the terminuses of said passages and inscribed at the front surfaces substantially in the path of said crossbars at the turn-back point of said endless driven member so that said eggs sliding down along the slope of each of said passages are turned to the vertical direction.

2. A device for arranging hen's eggs in erect postures according to claim 1, wherein said holders are constructed to contact with said eggs through weak elasticity.

3. A device for arranging hen's eggs in erect postures according to claim 1 or 2, wherein said holders are formed at the ends thereof to be able to upwardly bend or curve.

4. A device for arranging hen's eggs in erect postures according to claim 1, wherein said U-like shape grooved members comprise U-like shape grooves provided circumferentially of a rotary member and said grooves have side walls, said side walls being formed to rotate in condition of partially projecting from the path of each of said crossbars at the lower end turn-back point of said endless driven member.

5. A device for arranging hen's eggs in erect postures according to claim 1 or 4, wherein said side wall of each of said U-like shape grooves at said U-like shape grooved members is formed of an elastic member at at least the projecting portion from the path of said crossbars.

* * * * *